Jan. 8, 1935.  W. H. CURTIS  1,987,363
FLOW METER
Filed April 6, 1932  4 Sheets-Sheet 1
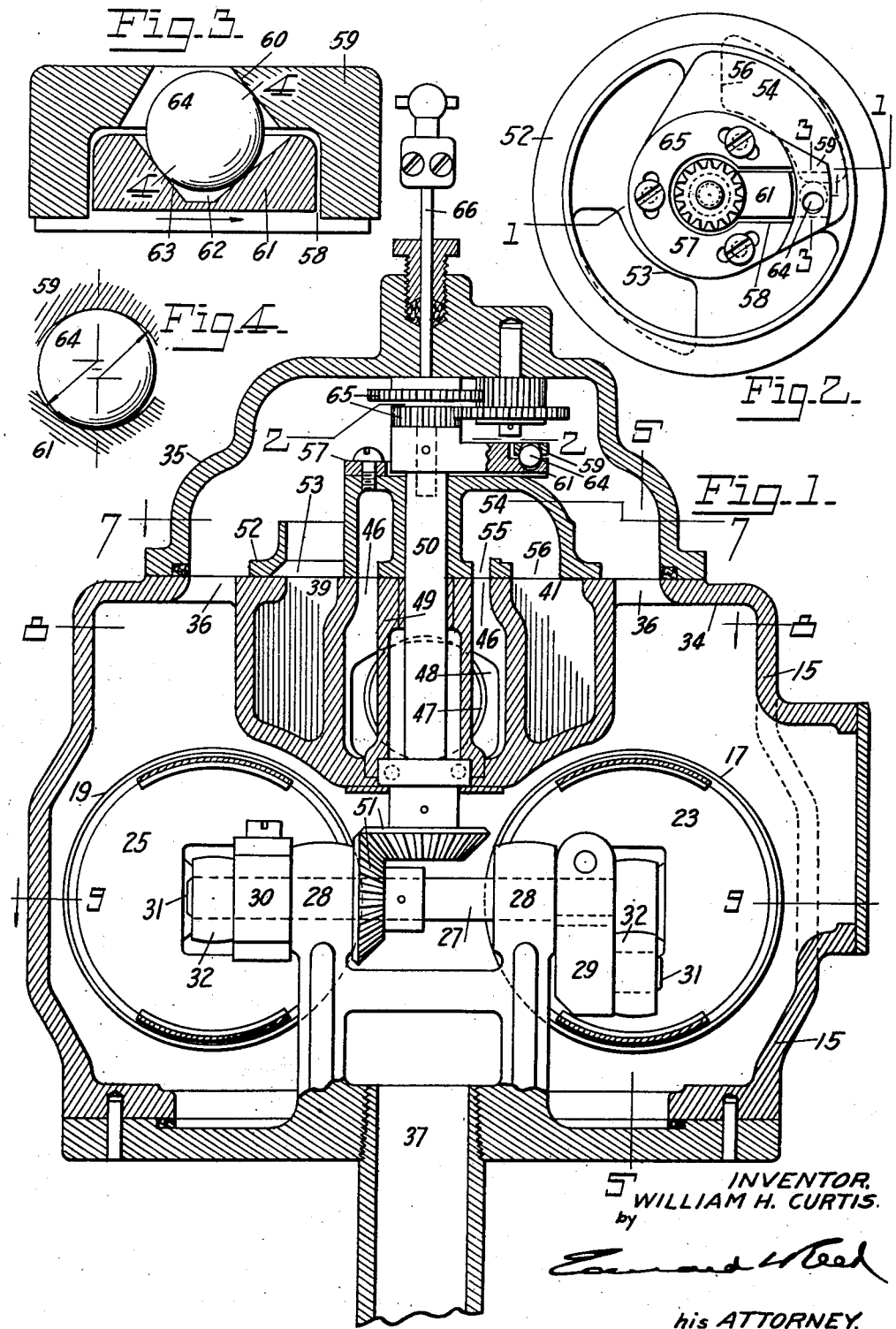
INVENTOR.
WILLIAM H. CURTIS.
by Edmund W. Reed
his ATTORNEY.

Jan. 8, 1935. W. H. CURTIS 1,987,363
FLOW METER
Filed April 6, 1932 4 Sheets-Sheet 2
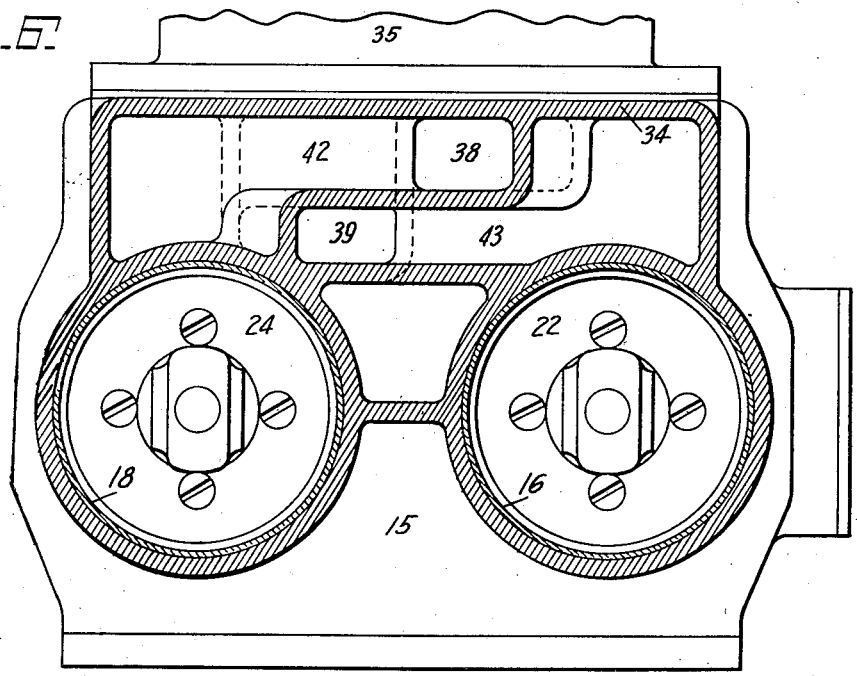
Fig. 6.
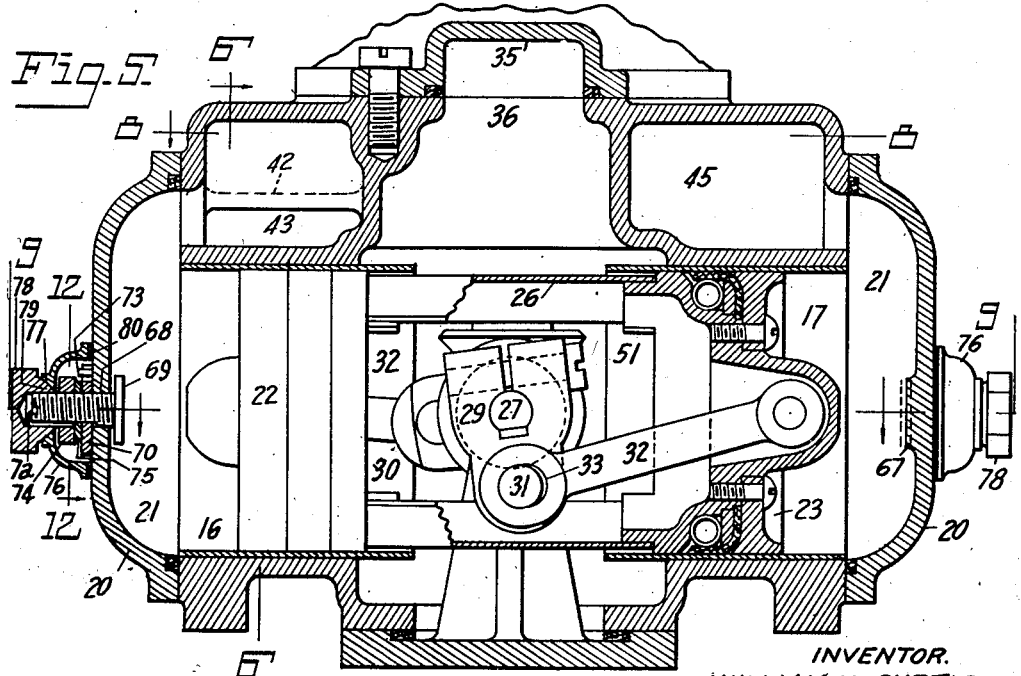
Fig. 5.
INVENTOR.
by WILLIAM H. CURTIS.
his ATTORNEY.

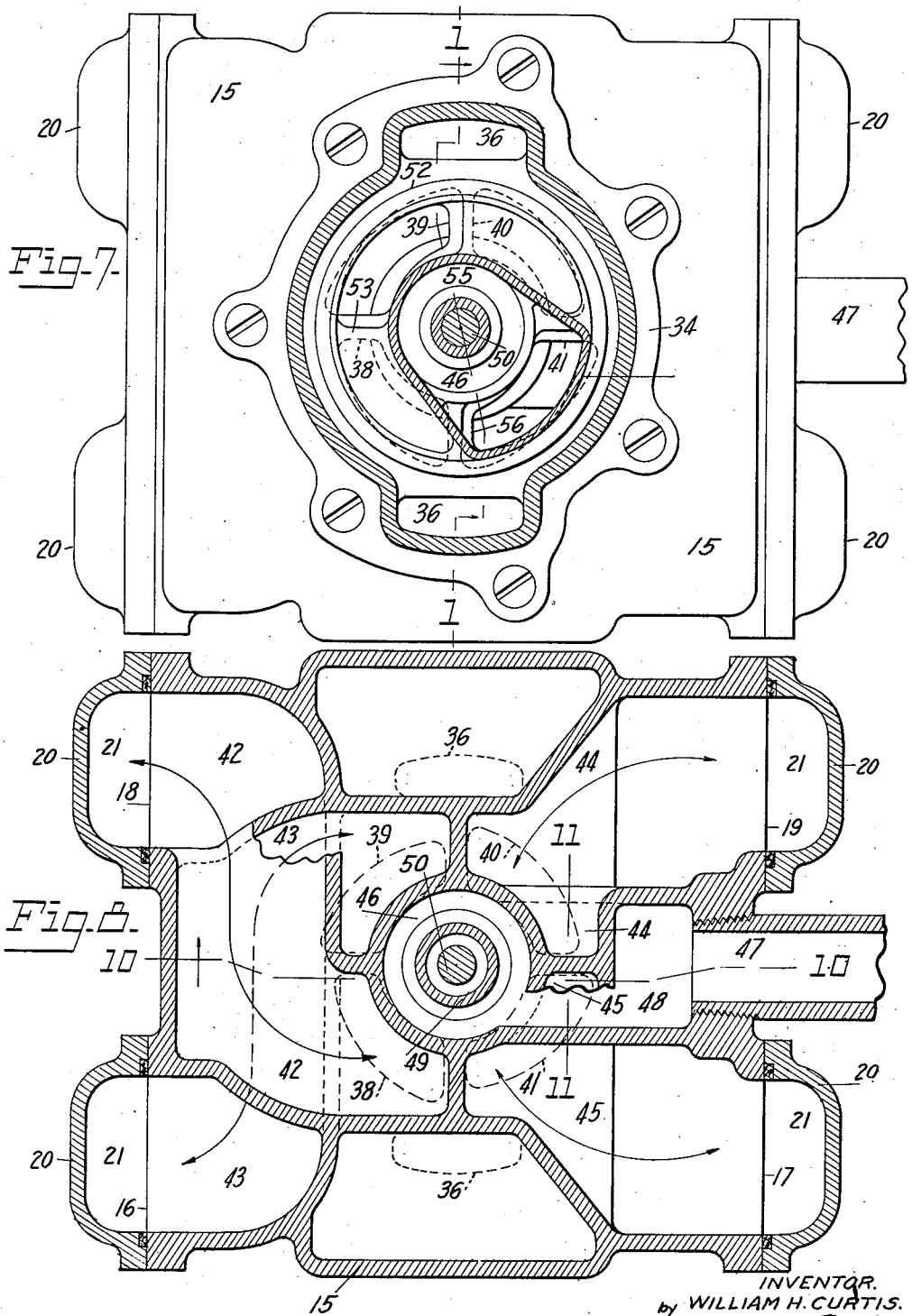

Jan. 8, 1935. W. H. CURTIS 1,987,363
FLOW METER
Filed April 6, 1932 4 Sheets-Sheet 4

INVENTOR.
by WILLIAM H. CURTIS.
his ATTORNEY.

Patented Jan. 8, 1935

1,987,363

UNITED STATES PATENT OFFICE 1,987,363

FLOW METER

William H. Curtis, Dayton, Ohio, assignor to National Pumps Corporation, Dayton, Ohio, a corporation of Ohio Application April 6, 1932, Serial No. 603,608

20 Claims. (Cl. 73—30)

This invention relates to flow meters and to similar apparatus and one object of the invention is to provide a meter with which the delivery of accurately measured quantities of liquid may be secured and maintained.

In many types of flow meters, such as for example, the reciprocatory piston type, the valve which controls the flow of fluid is held against its seat by fluid pressure within the valve chamber and this pressure causes the valve to engage its seat with a frictional contact which offers a substantial resistance to the movement of the valve. Further, such a valve is usually provided with a port in one side thereof, to connect the valve chamber with one or the other of the cylinders, while the other side of the valve is closed, that is, it has no opening communicating with the valve chamber. This, of course, results in an unequal pressure on the two sides of the valve and a corresponding unequal wear on the valve surfaces which in time may cause leakage.

A further object of the invention is to provide means whereby the fluid pressure on the valve will be opposed by other pressure sufficient to relieve the frictional contact of the valve on its seat without moving the valve out of engagement with its seat so as to permit leakage.

A further object of the invention is to so apply such pressure to the valve that the contact between the valve and its seat will be substantially uniform throughout the area of the valve, thus equalizing the wear on the face of the valve.

A further object of the invention is to provide a meter of the reciprocatory piston type in which the stroke of the piston may be determined by a device which is adjustable from the exterior of the meter without in any way interfering with the operation of the meter.

Other objects of the invention will appear as the apparatus is described in detail.

Figure 11:
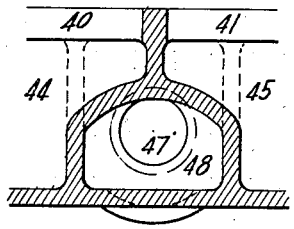
Figure 10:
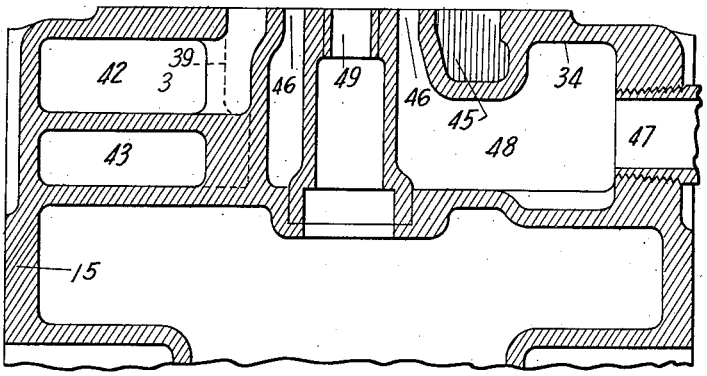
Figure 12:
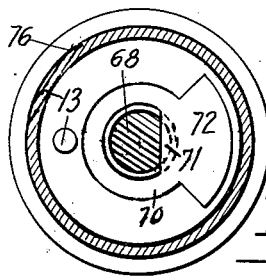
Figure 13:
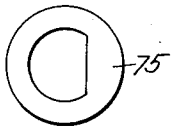
Figure 9:
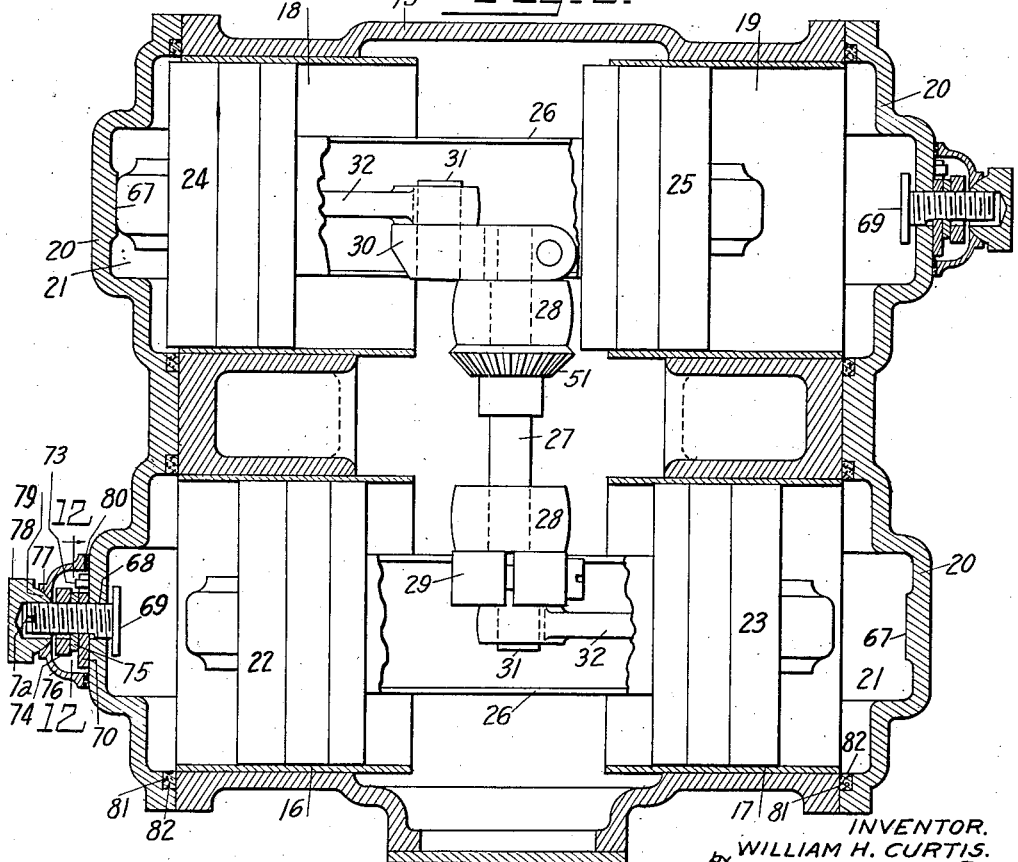

In the accompanying drawings Fig. 1 is a vertical sectional view taken centrally through a meter embodying my invention, on the line 1—1 of Fig. 7; Fig. 2 is a plan view of the valve; Fig. 3 is a section taken on the line 3—3 of Fig. 2; Fig. 4 is a section taken on the line 4—4 of Fig. 3; Fig. 5 is a section taken on the line 5—5 of Fig. 1; Fig. 6 is a transverse section taken on the line 6—6 of Fig. 5; Fig. 7 is a horizontal section taken on the line 7—7 of Fig. 1; Fig. 8 is a horizontal section taken on the line 8—8 of Fig. 1; Fig. 9 is a horizontal section taken on the line 9—9 of Fig. 1; Fig. 10 is a section taken on the line 10—10 of Fig. 8; Fig. 11 is a section taken on the line 11—11 of Fig. 8; Fig. 12 is a section taken on the line 12—12 of Fig. 9; and Fig. 13 is a detail view of the washer forming part of the stop device.

In these drawings I have illustrated one embodiment of my invention and have shown the same applied to a flow meter of a well known type but it will be understood that the apparatus may take various forms and may be applied in part or in whole to meters or similar apparatus of various kinds without departing from the spirit of the invention.

The meter here shown comprises a casing 15 having therein two pairs of cylinders 16 and 17 and 18 and 19, the cylinders of each pair being arranged in axial alinement and having their inner ends spaced one from the other. The outer ends of the cylinders are closed by cylinder heads 20 which form part of the exterior wall of the housing and, if desired, the cylinder heads at each end of the casing may be formed integral in pairs, as shown in Fig. 9. These cylinder heads are concave or provided with internal passageways 21 which extend upwardly beyond the top of the cylinder to connect the cylinders with conduits through which fluid is conducted to and from the same. Mounted in each cylinder is a piston, these pistons being indicated, respectively, by the reference numerals 22, 23, 24 and 25. The pistons for each pair of cylinders are connected one to the other for movement in unison and, in the present construction a cylindrical member 26 is secured to the inner ends of the pistons of each pair and has its intermediate portions cut away so as to provide a series of longitudinally extending plates or bars which rigidly connect the pistons. A transverse shaft 27 is mounted within the casing, in bearings 28, and has its end portions extending between the pistons of the respective pairs of pistons and provided with cranks 29 and 30 each having a wrist pin 31, the respective wrist pins being connected with one piston of the adjacent pair by a connecting rod 32. For a purpose which will hereinafter appear it is desirable that a lost motion connection be established between each pair of pistons and the crank shaft and, in the present construction, this lost motion is secured by providing each piston rod with an elongated bearing opening 33 to receive the wrist pin 31.

Above the cylinders the casing is provided with a transverse wall 34 the central portion of which constitutes a valve seat. Supported by this wall is a hollow structure or housing 35 enclosing the valve seat and providing a valve chamber which is in constant communication with the interior of the meter casing through ports 36 in the wall 34, these ports being arranged at the sides of the valve seat. The meter casing has in its lower portion, in the present instance in its bottom wall, an inlet 37 adapted to be connected with a source of supply of fluid under pressure. The fluid entering the casing through the inlet 37 rises therein, about the interior mechanism and passes through the ports 36 to the valve chamber. It will be noted that the interior mechanism of the meter is so arranged that fluid entering the same will pass about the crank shaft and between the pistons of each pair of pistons, the arrangement being such that the parts are subjected to equal pressure and the use of dividing walls and stuffing boxes is avoided.

The valve seat on the upper wall 34 is provided with a series of ports 38, 39, 40 and 41 which lead to the outer ends of the respective cylinders. In the arrangement here shown the port 38 is connected by a conduit 42 (see Figs. 8 and 10), with the cylinder 18. The port 39 is connected by a conduit 43 with the cylinder 16, this conduit crossing and extending beneath the conduit 42. The port 40 is connected by a conduit 44 with cylinder 19, and port 41 is connected by a conduit 45 with the cylinder 17. The valve seat is also provided with a discharge port 46 leading to an outlet 47, this discharge port being in the present instance annular in form and being connected with the outlet by a conduit 48. In the present construction the inner wall of the annular discharge conduit is formed by a tubular member 49 which is provided with bearings for a vertical shaft 50 which is connected at its lower end with the crank shaft 27 by beveled gears 51, the upper end of which shaft extends a considerable distance above the valve seat.

Rotatably supported on the valve seat within the valve chamber is a valve 52 which, in the present instance, is loosely mounted about the shaft 50 and is driven therefrom. This valve is provided at one side thereof with a port 53 opening through the same to connect the valve chamber successively with the ports 38, 39, 40 and 41 as the valve is rotated. On the other side of the valve is an interior conduit 54 one end of which is connected at all times with the annular discharge port 46 by means of a port 55. The other end of the conduit 54 terminates in a port 56 which is movable successively into register with the ports 38, 39, 40 and 41. This internal conduit or passageway serves to successively connect the cylinder ports with said discharge port. With the valve in the position shown in the Figs. 1 and 7, the pair of pistons 24 and 25 have just completed their movement to the left in Fig. 9 and fluid is now flowing through the ports 53 and 39 and the conduit 43 to the outer end of the cylinder 16 and is moving the pistons 22 and 23 to the right, the fluid being discharged from the cylinder 17 through the conduit 45 and ports 41, 56 and 55 to the discharge port leading to the outlet. It will be apparent that the port 53 is of such length that it will during portions of its travel overlap two of the cylinder ports as the valve is rotated and that fluid pressure will be admitted to a succeeding cylinder before the movement of the piston in the next preceding cylinder has been completed, thus maintaining a substantially continuous uniform movement of the shaft 50.

The valve is actuated from the shaft 50, which in turn is driven from the crank shaft 27 and, in the present construction, the driving connection between the shaft 50 and the valve is utilized to exert a pressure on the valve in a direction away from its valve seat and opposed to the fluid pressure in the valve chamber. For this purpose I have rigidly secured to the valve, preferably to the top thereof, a member or plate 57 which is provided with a substantially radial slot 58 and which has a part 59 extending above and overhanging the outer end of the slot. The lower surface of this overhanging part is provided with a contact surface 60 which is inclined downwardly and transversely to the slot 58 in the direction of the normal movement of the valve. Rigidly secured to the shaft 50 is an arm 61 which extends through the slot 58 in the plate 57 and is of such width that it may have a limited transverse movement in that slot. The outer end of this arm extends beneath the overhanging portion 59 of the plate and is provided in its upper surface with a recess 62, the rear wall of which is preferably inclined, as shown at 63, that is, the surface 63 is directly opposed to the inclined surface 60 of the plate. Supported within the recess 62 is a rotatable member, preferably a ball, 64 which projects above the upper surface of the arm 61 and engages the inclined contact surface 60 of the plate, thus establishing driving connection between the arm 61 and the plate 57. Because of the inclined arrangement of the contact surface with which the ball engages the movement of the ball in a horizontal plane, with the arm 61, will exert both a lateral pressure and an upward pressure on the plate 57 so as to cause the plate and its valve to be rotated and to cause pressure to be exerted upwardly on the plate and the valve. The inclination of the contacting surface or surfaces is carefully determined so that the upward pressure exerted on the plate and the valve will substantially counteract the fluid pressure on the valve but will not be sufficient to lift the valve out of engagement with its seat so as to permit leakage. It will be noted that the connection between the arm 61 and the plate 57 is at the closed side of the valve, opposite the port 53, and consequently the greatest upward pressure on the valve is at that point which is subjected to the greatest fluid pressure and this results in providing a substantially uniform contact between the valve and its valve seat throughout the area of the valve and avoids the unequal wear on the valve surface which results from unequal pressures on the valve.

The upper end of the shaft 50 is connected through a gear train 65 with a shaft 66 which projects above the meter casing and is adapted for connection with the usual indicator or registering device.

It is desirable that means should be provided for varying the stroke of the pistons so as to correctly determine the amount of fluid discharged upon each stroke of each piston. In order that this adjustment of the stroke may be secured from the exterior of the meter casing I have provided the cylinder heads 20, with stops arranged to contact with the respective pistons and positively limit the movement thereof. At least one stop for each pair of pistons is adjustable and, in the present instance, I have shown adjustable stops for the pistons 22 and 25 and fixed stops or pads 67 for the pistons 23 and 24. Each adjustable stop is here shown as a screw threaded rod or stud 68 mounted in the cylinder head 20 and preferably provided at its inner end with a head 69 with which the piston contacts. The outer portion of the stud extends some distance beyond the cylinder head and is provided with a kerf 7a to receive a screw driver by means of which it may be rotated. When the meter is assembled and tested this stud is adjusted to its proper position and is then rigidly secured in that position. Should it be necessary, in order to secure the proper discharge, to stop the movement of the piston before the crank connected therewith had completed its movement, that is, before it had crossed dead center, the contact of the piston with its stop would lock the crank shaft against further movement, thereby stopping the meter. However, as above explained, I have provided a lost motion connection between the piston and the crank, in the nature of an elongated bearing 33 for the wrist pin 31, and consequently if the piston is stopped before the crank has completed its movement the pressure applied to the crank shaft by the next succeeding piston will rotate the shaft, and the wrist pin has sufficient movement with relation to and lengthwise of its pitman to permit the crank to cross dead center and to continue its movement under the action of the succeeding piston.

It is sometimes necessary to adjust the stop 68 after the meter has been installed and it is important that this adjustment should not inadvertently be such as to reduce the stroke of the piston beyond the limits of the lost motion connection between the same and the pitman as this would result in the stopping of the meter. I have therefore provided a special locking means for the stud so as to positively limit its movement. After the stop or stud 68 has been initially adjusted a locking member or washer 70 is mounted thereon and held against rotation with relation thereto, preferably by providing the stud and washer with flattened surfaces 71. This washer is provided with a substantially radial projection 72 which, in the present instance, is sector shaped and after the stop or stud has been adjusted at the factory a pin 73 is inserted in the cylinder head directly opposite the projection 72 and in the path thereof so as to positively limit the rotation of the stud 68 in either direction but to allow it a substantially equal movement in both directions. A jam nut 74 is then threaded onto the stud and tightened down to secure the stud and locking member against rotation, a washer 75 being preferably interposed between the nut and the locking member. A cap or housing 76 is then placed over the outer portion of the stud and the parts carried thereby and this housing has in its outer wall an opening through which the end of the stud may extend and is provided about this opening with a seat 77. The nut 78 is then threaded onto the outer end of the stud and has a part 79 to engage the seat 77 on the housing and press the latter against the cylinder head and to provide a tight joint between the nut 78 and the housing so as to prevent the escape of any fluid which might seep about the stud. A gasket 80 is interposed between the housing and the cylinder head.

It is important that the cylinder heads should be of such a character that tight joints may be maintained between the same and the cylinders but it is equally important that the maintaining of this tight joint shall not alter the position of the cylinder head with relation to the cylinder as this would destroy the adjustment of the stops 68 and 67. In the present construction the cylinder heads are of such a character that they will directly contact with the ends of the cylinders, or the adjacent portions of the meter casing, and are provided with channels in which is arranged a gasket to engage the end of the cylinder and which will be compressed within the channel sufficiently to permit the cylinder head to have a metal to metal contact with the end of the cylinder, thus tightly sealing the joint and definitely locking the cylinder head with relation to the cylinder. As shown in the drawings each cylinder head has its outer circumferential portion in direct contact with that portion of the meter casing surrounding the respective cylinders and has in its inner edge a channel or rabbet 81 in which is mounted a packing 82.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an apparatus of the character described comprising a valve chamber adapted to be connected with a source of supply fluid under pressure, said valve chamber having a valve seat within the same and having a plurality of ports opening through said valve seat, a rotatable shaft extending through said valve seat, and a valve loosely mounted about said shaft and rotatable on said valve seat, said valve having a port opening through one side thereof to connect said valve chamber with one of the ports in said valve seat and having its other side closed and subject to the pressure of fluid in said valve chamber, a member rigidly secured to said valve, having a substantially radial slot adjacent to the closed side of said valve and having a part arranged above and extending across the outer end of said slot, said part having a lower surface inclined downwardly and transversely to said slot, a second member secured to said shaft, arranged in said slot for movement relatively thereto and having a recess beneath the part of the first mentioned member, said recess having an inclined surface opposed to the inclined surface of said part of the first mentioned member, and a ball loosely supported in said recess and adapted to engage said opposed inclined surfaces.

2. An apparatus of the character described comprising a casing having an inlet in the lower portion thereof and an outlet in the upper portion thereof and also having an upper wall provided with a valve seat, two pairs of cylinders in said casing, the cylinders of each pair being arranged in axial alinement and spaced one from the other, pistons mounted in the respective cylinders, the pistons for each pair of cylinders being connected one to the other, a shaft rotatably supported in said casing with its ends arranged between the cylinders of the respective pairs of cylinders, cranks on the ends of said shaft, means for connecting said cranks with the respective pistons, a hollow structure carried by said upper wall and forming a valve chamber, said upper wall having ports through which fluid passing from said inlet through said casing may enter said valve chamber, said valve seat having ports leading to the respective cylinders and also having a discharge port leading to said outlet, a second shaft connected with the first mentioned shaft and extending through said valve seat, a valve engaging said valve seat and rotatable about said shaft to control the ports in said valve seat, and means actuated by said second shaft to rotate said valve.

3. An apparatus of the character described comprising a casing having an inlet in the lower portion thereof and an outlet in the upper portion thereof and also having an upper wall provided with a valve seat, two pairs of cylinders in said casing, the cylinders of each pair being arranged in axial alinement and spaced one from the other, pistons mounted in the respective cylinders, the pistons for each pair of cylinders being connected one to the other, a shaft rotatably supported in said casing with its ends arranged between the cylinders of the respective pairs of cylinders, cranks on the ends of said shaft, means for connecting said cranks with the respective pistons, a hollow structure carried by said upper wall and forming a valve chamber, said upper wall having ports through which fluid passing from said inlet through said casing may enter said valve chamber, said valve seat having ports leading to the respective cylinders and also having a discharge port leading to said outlet, a second shaft connected with the first mentioned shaft and extending through said valve seat, a valve engaging said valve seat and rotatable about said shaft, said valve having a port to connect said valve chamber successively with the ports leading to said cylinders and having a second port to connect said cylinder ports successively with said discharge port, and means actuated by said second shaft to rotate said valve and to exert pressure on said valve in a direction away from said valve seat.

4. In an apparatus of the character described, a cylinder, a head for said cylinder, a piston mounted in said cylinder, and an adjustable stop to limit the stroke of said piston comprising a stud extending through said cylinder head and having screw threaded connection therewith, a member mounted in the outer portion of said stud for rotation therewith, means to limit the rotation of said member and said stud, and a nut on said stud to lock said stud and said member against rotation.

5. In an apparatus of the character described, a cylinder, a head for said cylinder, a piston mounted in said cylinder, and an adjustable stop to limit the stroke of said piston comprising a stud extending through said cylinder head and having screw threaded connection therewith, a washer mounted on the outer portion of said stud, held against rotation with relation thereto and having a substantially radial projection, a part carried by said cylinder head in the path of said projection, and a nut on said stud to lock said washer against rotation.

6. In an apparatus of the character described, a cylinder, a head for said cylinder, a piston mounted in said cylinder, and an adjustable stop to limit the stroke of said piston comprising a stud extending through said cylinder head and having screw threaded connection therewith, a member mounted on the outer portion of said stud for rotation therewith, means to limit the rotation of said member and said stud, a nut on said stud to lock said stud and said member against rotation, a housing enclosing said nut and said member, bearing against said cylinder head, having an opening through which the outer end of said stud extends and having a seat about said opening, and a nut mounted on the outer end of said stud and having a part to engage said seat to tightly close said opening and to press said housing against said cylinder head.

7. In a fluid meter comprising a metering device, a valve chamber adapted to be connected with a source of supply of fluid under pressure and to deliver fluid to said metering device, said valve chamber having a valve seat within the same and having a plurality of ports opening through said valve seat, and a valve rotatable on said valve seat and urged toward the same by the pressure of the fluid in said valve chamber, an actuating device driven by said metering device and having means to rotate said valve and to exert pressure thereon in opposition to the fluid pressure thereon during the rotation thereof.

8. In a fluid meter comprising a metering device, a valve chamber adapted to be connected with a source of supply of fluid under pressure and to deliver fluid to said metering device, said valve chamber having a valve seat within the same and having a plurality of ports opening through said valve seat, a valve rotatable on said valve seat and urged toward the same by the pressure of the fluid in said valve chamber, an actuating device for said valve comprising a part connected with said valve, and a member driven by said metering device and having a part to engage the first mentioned part and rotate said valve, said parts being arranged to exert pressure on said valve in a direction to resist the pressure exerted thereon by the fluid in said valve chamber.

9. In a fluid meter comprising a metering device, a valve chamber adapted to be connected with a source of supply of fluid under pressure and to deliver fluid to said metering device, said valve chamber having a valve seat within the same and having a plurality of ports opening through said valve seat, a rotatable shaft extending through said valve seat, means controlled by said metering device to rotate said shaft, and a valve mounted about said shaft in said valve chamber for rotation on said valve seat and subjected to the pressure of the fluid in said valve chamber, an actuating device for said valve comprising a member connected with said valve and a member connected with said shaft, one of said members having an inclined surface and the other of said members having a part to act on said inclined surface to establish driving connection between said members and to resist the pressure exerted on said valve by the fluid in said valve chamber.

10. In a fluid meter comprising a metering device and a valve chamber adapted to be connected with a source of supply of fluid under pressure, said valve chamber having a valve seat within the same provided with a plurality of ports connected with said metering device, a valve rotatable on said valve seat to successively connect said ports with said valve chamber, said valve being subjected to the pressure of the fluid in said valve chamber, and means actuated by said metering device to rotate said valve and to exert pressure thereon in opposition to the fluid pressure thereon during the rotation thereof.

11. In a fluid meter comprising a metering device and a valve chamber adapted to be connected with a source of supply of fluid under pressure, said valve chamber having a valve seat within the same provided with a plurality of ports connected with said metering device, a valve rotatable on said valve seat to successively connect said ports with said valve chamber, said valve being subjected to the pressure of the fluid in said valve chamber, an actuating device comprising a part connected with said valve, and a driven member acting on said part to rotate said valve and to exert constant pressure on said valve in a direction away from said valve seat, and means controlled by said metering device for operating said driven member.

12. In a fluid meter comprising a metering device and a valve chamber adapted to be connected with a source of supply of fluid under pressure, said valve chamber having a valve seat within the same provided with a plurality of ports communicating with said metering device, a rotatable shaft extending through said valve seat, a valve loosely mounted about said shaft and rotatable on said valve seat to successively connect said ports with said valve chamber, an actuating member connected with said valve, and a member connected with said shaft and acting on said actuating member to simultaneously rotate said valve and exert pressure thereon in a direction away from said valve seat.

13. In a fluid meter comprising a metering device and a valve chamber adapted to be connected with a source of supply of fluid under pressure, said valve chamber having a valve seat within the same provided with a plurality of ports communicating with said metering device, a rotatable shaft extending through said valve seat, a valve loosely mounted about said shaft and rotatable on said valve seat to successively connect said ports with said valve chamber, actuating means for said valve comprising a member connected with said valve and having an inclined surface spaced from the axis of said valve, a member connected with said shaft, and a part carried by the last mentioned member to engage the inclined surface on the first mentioned member to rotate said valve and to exert pressure on said valve in opposition to the pressure of the fluid in said valve chamber.

14. In a fluid meter, comprising a metering device and a valve chamber adapted to be connected with a source of supply of fluid under pressure, said valve chamber having a valve seat within the same provided with a plurality of ports communicating with said metering device, a rotatable shaft extending through said valve seat, a valve loosely mounted about said shaft and rotatable on said valve seat to successively connect said ports with said valve chamber, actuating means for said valve comprising a member connected therewith and having an inclined surface spaced from the axis of said valve, a member connected with said shaft, and a part rotatably supported on the last mentioned member to engage the inclined surface on the first mentioned member and rotate said valve and exert pressure on said valve in opposition to the pressure of the fluid in said valve chamber.

15. In a fluid meter comprising a metering device and a valve chamber adapted to be connected with a source of supply of fluid under pressure, said valve chamber having a valve seat within the same provided with a plurality of ports communicating with said metering device, a rotatable shaft extending through said valve seat, a valve loosely mounted about said shaft and rotatable on said valve seat to successively connect said ports with said valve chamber, actuating members connected, respectively, with said valve and said shaft, extending laterally from said shaft and having opposed inclined surfaces, and a rotatable member interposed between said opposed surfaces to operatively connect said actuating members and to resist the pressure of the fluid in said valve chamber on said valve.

16. In a fluid meter comprising a metering device and a valve chamber adapted to be connected with a source of supply of fluid under pressure, said valve chamber having a valve seat within the same provided with a plurality of ports communicating with said metering device, a rotatable shaft extending through said valve seat, a valve loosely mounted about said shaft and rotatable on said valve seat to successively connect said ports with said valve chamber, actuating means for said valve comprising a member connected therewith and having an inclined surface spaced from said shaft, a member connected with said shaft and having a recess adjacent to the inclined surface of the first mentioned member, and a ball supported in said recess and adapted to engage said inclined surface, said ball constituting the sole driving connection between said members and acting on said inclined surface to oppose the pressure exerted on said valve by the fluid in said valve chamber.

17. In a fluid meter comprising a metering device and a valve chamber adapted to be connected with a source of supply of fluid under pressure, said valve chamber having a valve seat within the same provided with a plurality of ports connected with said metering device, a valve rotatably mounted on said valve seat, having a port opening therethrough on one side of its axis to connect said valve chamber successively with the ports in said valve seat and having that portion thereof on the other side of its axis closed and subjected to the pressure of the fluid in said valve chamber, and an actuating device having means driven by said metering device for rotating said valve and for exerting pressure on the closed portion of said valve in opposition to the fluid pressure thereon during the rotation thereof.

18. In a fluid meter comprising a metering device and a valve chamber adapted to be connected with a source of supply of fluid under pressure, a valve seated within said valve chamber, having a plurality of ports connected with said metering device and also having an outlet port, a valve rotatable on said valve seat and having a port to successively connect the first mentioned ports in said valve seat with said valve chamber and also having a passageway opening through the inner face only thereof to successively connect said first mentioned ports with said outlet port, and an actuating device comprising means driven by said metering device for rotating said valve and exerting pressure thereon adjacent to said passageway and in a direction away from said valve seat during the rotation thereof.

19. In a fluid meter comprising a metering device and a valve chamber adapted to be connected with a source of supply of fluid under pressure, said valve chamber having a valve seat within the same provided with a plurality of ports communicating with said metering device, a rotatable shaft extending through said valve seat, a valve loosely mounted about said shaft and rotatable on said valve seat to successively connect said ports with said valve chamber, said valve having a port opening therethrough on one side of its axis to successively connect the ports in said valve seat with said valve chamber and having that portion on the other side of said axis closed and subjected to the pressure of the fluid in said valve chamber, a member rigidly secured to said valve and having an inclined surface adjacent to the closed portion of said valve and facing said valve seat, a second member secured to said shaft, and a part carried by said second member and arranged to engage said inclined surface and rotate said valve and exert pressure thereon in opposition to the pressure in said valve chamber.

20. In a fluid meter comprising a metering device and a valve chamber adapted to be connected with a source of supply of fluid under pressure, said valve chamber having a valve seat within the same provided with a plurality of ports connected with said metering device, a valve rotatable on said valve seat to successively connect said ports with said valve member and urged toward said valve seat by the pressure of the fluid in said valve chamber, and means driven by said metering device to impart operative movement to said valve and to exert pressure thereon in opposition to said fluid pressure during such movement.

WILLIAM H. CURTIS.